US012616943B2

(12) United States Patent
Sharma et al.

(10) Patent No.: US 12,616,943 B2
(45) Date of Patent: May 5, 2026

(54) ULTRATHIN MEMBRANES FOR NANOSCALE PORES AND CHANNELS

(71) Applicant: ILLUMINA, INC., San Diego, CA (US)

(72) Inventors: Rajesh Kumar Sharma, Singapore (SG); Gerald Kreindl, San Diego, CA (US); Anthony Flannery, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 424 days.

(21) Appl. No.: 18/332,593

(22) Filed: Jun. 9, 2023

(65) Prior Publication Data

US 2023/0398503 A1     Dec. 14, 2023

Related U.S. Application Data

(60) Provisional application No. 63/351,308, filed on Jun. 10, 2022.

(51) Int. Cl.
*B01D 69/12* (2006.01)
*B01D 61/42* (2006.01)
*B01D 67/00* (2006.01)
*B01D 71/02* (2006.01)

(52) U.S. Cl.
CPC ............. *B01D 69/12* (2013.01); *B01D 61/42* (2013.01); *B01D 67/0074* (2013.01); *B01D 71/022* (2013.01); *B01D 2325/0283* (2022.08); *B01D 2325/04* (2013.01)

(58) Field of Classification Search
None
See application file for complete search history.

(56) References Cited

U.S. PATENT DOCUMENTS

2014/0034497 A1* 2/2014 Davis ............... G01N 27/44791
                                                    438/689
2018/0073161 A1* 3/2018 Feng ......................... C25F 7/00
2020/0171489 A1* 6/2020 Meller ............. G01N 33/48721
2023/0112203 A1* 4/2023 Boyanov ............ G01N 27/4146
                                                    435/61

OTHER PUBLICATIONS

Cheng et al., "Freestanding ultrathin nano-membranes via self-assembly" Nano Today (2009) 4, 482-493 (Year: 2009).*

* cited by examiner

*Primary Examiner* — Krishnan S Menon
(74) *Attorney, Agent, or Firm* — Dierker & Kavanaugh, P.C.

(57)     ABSTRACT

A nanopore sensing system includes a cis well, a trans well, and a metal based membrane positioned between the cis and trans wells so that a channel defined in the metal based membrane fluidically connects the cis and trans wells. The metal based membrane has a thickness ranging from about 1 nm to about 3 nm and is selected from the group consisting of a metal oxide, a metal sulfide, a metal nitride, a metal phosphide, a metal arsenide, a metal antimonide, a metal selenide, and a metal telluride.

5 Claims, 2 Drawing Sheets

ULTRATHIN MEMBRANES FOR NANOSCALE PORES AND CHANNELS

CROSS REFERENCE TO RELATED APPLICATION

This application claims the benefit of U.S. Provisional Application Ser. No. 63/351,308, filed Jun. 10, 2022, the contents of which are incorporated by reference herein in their entirety.

BACKGROUND

Various polynucleotide sequencing techniques involve performing a large number of controlled reactions on local support surfaces or within predefined reaction chambers. The designated reactions may then be observed or detected, and subsequent analysis may help identify or reveal properties of the polynucleotide involved in the reaction. Another polynucleotide sequencing technique has been developed that utilizes a nanopore, which can provide a channel for an ionic electrical current. A polynucleotide or label/tag of an incorporated nucleotide is driven into the nanopore, changing the resistivity of the nanopore. Each nucleotide (or series of nucleotides) or each label/tag (or series of labels/tags) yields a characteristic electrical signal, and the record of the signal levels corresponds to the sequence of the polynucleotide.

SUMMARY

The nanopore sensing systems disclosed herein include an ultrathin (i.e., thickness ranging from about 1 nm to about 3 nm) metal based membrane. A channel formed through the membrane can function as a nanopore for polynucleotide sequencing or can hold a biological pore for polynucleotide or protein sequencing.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The technique of nanopore sensing uses variations in electrical signal to distinguish nucleotide bases. Nanopore sensor devices often include a cis well fluidly connected to a plurality of trans wells and respective nanopores fluidically connecting the cis well to each of the trans wells. Electrodes are utilized to translocate a polynucleotide through the nanopores, which changes the resistivity of the nanopores. Each nucleotide (or series of nucleotides) yields a characteristic electrical signal, and the record of the signal levels corresponds to the sequence of the polynucleotide.

In the examples disclosed herein, an ultrathin (i.e., thickness ranging from about 1 nm to about 3 nm) metal based membrane is positioned between the cis well and each of the trans wells, and this membrane defines or holds the nanopores that fluidically connect the cis well to each of the trans wells.

Figure 1:
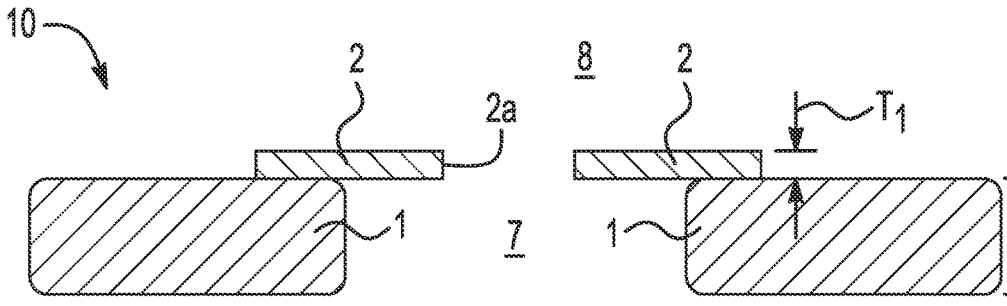
FIG. 1 is a schematic illustration of one example of a nanopore sensing system.

FIG. 1 schematically depicts a portion of one example nanopore sensing system 10 that includes the cis well 8, the trans well 7, and a metal based membrane 2 positioned between the cis and trans wells 8, 7 so that a channel 2a defined in the metal based membrane 2 fluidically connects the cis and trans wells 8, 7, the metal based membrane 2 having a thickness ranging from about 1 nm to about 3 nm and being selected from the group consisting of a metal oxide, a metal sulfide, a metal nitride, a metal phosphide, a metal arsenide, a metal antimonide, a metal selenide, and a metal telluride. Particular examples of the metal oxide membrane include tin oxide, gallium oxide, antimonous oxide (which can be synthesized in air), titanium oxide, indium tin oxide, tantalum oxide, hafnium oxide, aluminum oxide, ruthenium oxide, zirconium oxide, titanium aluminum oxide, aluminum oxynitride, hafnium aluminum oxide, and combinations thereof. Particular examples of the metal sulfide membrane include tin sulfide, gallium sulfide, and indium sulfide. Depending upon the material that defines the metal based membrane 2, the metal based membrane 2 may be electrically conductive or insulating.

The thickness $T_1$ of the membrane 2 ranges from about 1 nm to about 3 nm. Examples for making the membrane 2 are described in further detail below.

The membrane 2 has a channel 2a that extends through the entire thickness of the membrane 2. Thus, this channel 2a creates an opening between the trans well 7 (defined in the substrate 1) and the cis well 8. The channel 2a may have any suitable aspect ratio, which depends, in part, upon the biomolecule that is to be translocated through the channel 2a. Examples of suitable biomolecules include deoxyribonucleic acids (DNA), ribonucleic acids (RNA), proteins, exosomes, lysosomes, or combinations thereof.

The width/height of the channel 2a is equivalent to the thickness of the membrane 2, and the length of the channel 2a may range from about 1 nm to about 1,000 nm. As examples, the length of the channel 2a may range from about 1 nm to about 100 nm, or from about 100 nm to about 500 nm.

The chemical make-up of the metal based membrane 2 is relatively uniform and homogenous. Depending upon the metal precursors used to generate the metal based membrane 2, the structure may be crystalline or amorphous.

In this example nanopore sensing system 10, the channels 2a of the metal based membrane 2 are solid-state nanopores because the structure portion (i.e., the membrane 2) is of non-biological origin.

In this example, the metal based membrane 2 is a free standing membrane that is partially supported by the substrate 1 and that extends over the trans well 7 that is formed in the substrate 1.

The substrate 1 may be a rigid, solid support that is insoluble in an aqueous liquid and that is incapable of passing a liquid therethrough, absent an aperture, port, etc. defined therein. In the examples disclosed herein, the substrate 1 may have the trans wells 7 defined therein. Examples of suitable substrates 1 include glass and modified or functionalized glass, polymer (including acrylics, polystyrene and copolymers of styrene and other materials, polypropylene, polyethylene, polybutylene, polyurethanes, polytetrafluoroethylene (PTFE) (such as TEFLON® from Chemours)), cyclic olefins/cyclo-olefin polymers (COP) (such as ZEONOR® from Zeon), polyimides, nylon (polyamides), ceramics, silica or silica-based materials, silicon, silicon nitride, sapphire, other semiconductor materials, or other dielectric materials.

The thickness $T_2$ of the substrate 1 ranges from about 100 nm to about 3,000 nm.

Figure 2:
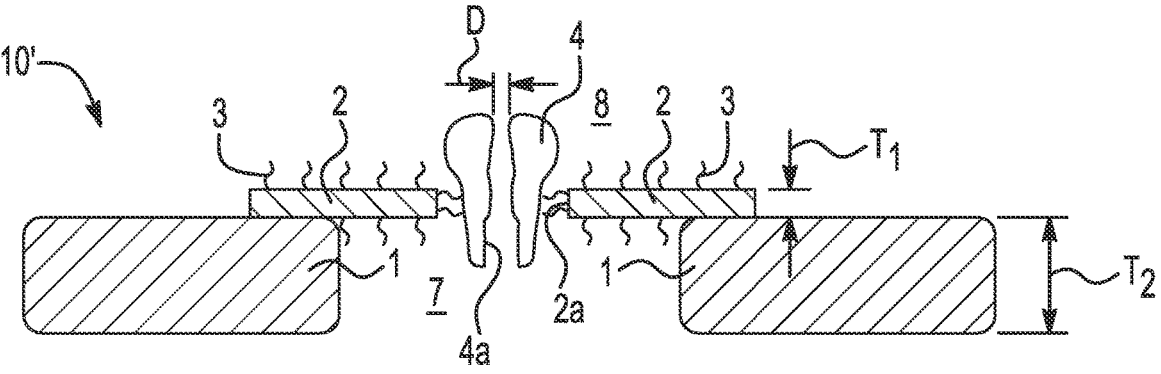
FIG. 2 is a schematic illustration of another example of a nanopore sensing system.

FIG. 2 schematically depicts a portion of another example nanopore sensing system 10' that includes the metal based membrane 2 having the channel(s) 2a defined therethrough. In this example, the channel 2a receives and holds a biological nanopore 4. As such, in some examples, the nanopore sensing system 10' further includes a biological nanopore inserted into an opening in the metal based membrane 2.

The biological nanopore 4 is a nanopore whose structure portion is made from materials of biological origin. Biological origin refers to a material derived from or isolated from a biological environment such as an organism or cell, or a synthetically manufactured version of a biologically available structure. Biological nanopores include, for example, polypeptide nanopores and polynucleotide nanopores.

As used herein, the term "polypeptide nanopore" is intended to mean a protein or peptide (e.g., a polypeptide) that extends across the membrane 2, and permits ions and/or fluids to flow therethrough from one side of the membrane 2 to the other side of the membrane 2. A polypeptide nanopore can be a monomer, a homopolymer, or a heteropolymer. Structures of polypeptide nanopores include, for example, an α-helix bundle nanopore and a β-barrel nanopore. Example polypeptide nanopores include α-hemolysin, *Mycobacterium smegmatis* porin A (MspA), gramicidin A, maltoporin, OmpF, OmpC, PhoE, Tsx, F-pilus, etc. The protein α-hemolysin is found naturally in cell membranes, where it acts as a channel for ions or molecules to be transported in and out of cells. *Mycobacterium smegmatis* porin A (MspA) is a membrane porin produced by Mycobacteria, which allows hydrophilic molecules to enter the bacterium. MspA forms a tightly interconnected octamer and transmembrane beta-barrel that resembles a goblet and contains a central channel/pore.

A polypeptide nanopore can be synthetic. A synthetic polypeptide nanopore includes a protein-like amino acid sequence that does not occur in nature. The protein-like amino acid sequence may include some of the amino acids that are known to exist but do not form the basis of proteins (i.e., non-proteinogenic amino acids). The protein-like amino acid sequence may be artificially synthesized rather than expressed in an organism and then purified/isolated.

As used herein, the term "polynucleotide nanopore" is intended to include a polynucleotide that extends across the membrane, and permits ions and/or fluids to flow from one side of the membrane to the other side of the membrane. A polynucleotide pore can include, for example, a polynucleotide origami (e.g., nanoscale folding of DNA to create the nanopore).

The biological nanopore 4 includes its own channel 4a, which has a (consistent or varying) diameter D ranging from about 0.5 nm to about 20 nm.

In some examples, the membrane 2 may be functionalized with various chemical groups 3. Examples of such chemical groups 3 include amine groups, carboxyl or carboxylic acid groups, disulfides, etc. The functionalization of the membrane 2 may be selected to covalently bond the biological nanopore 4 inside the channel 2a of the metal based membrane 2. As examples, functionalization may be performed by surface engineering through chemical bonding, physisorption, or utilizing oxygen vacancies and doping.

Figure 3:
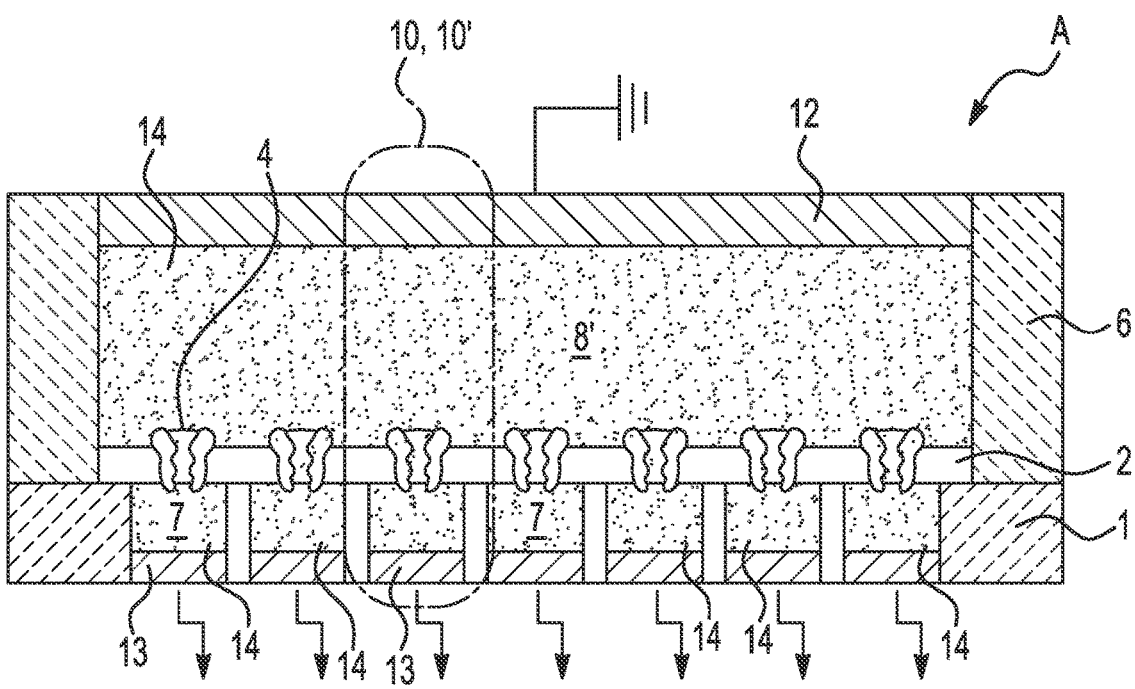
FIG. 3 is a schematic and partially cross-sectional view of a nanopore sensing system including a sensor array.

The nanopore sensing systems 10, 10' may include a 1:1 ratio of cis wells 8 to trans wells 7. Alternatively, either of the nanopore sensing systems 10, 10' may be a part of a nanopore sensor array A, an example of which is shown in FIG. 3. The nanopore sensor array A includes a common cis well 8' with a cis/top electrode 12 and an array of trans wells 7 with individually addressable trans/bottom electrodes 13. The membrane 2 is positioned over each of the openings of the trans wells 7, and the channels 2a (with or without nanopores 4 positioned therein) fluidically connect the cis well 8' and the respective trans wells 7, and an electrolyte 14 is in the cis well 8' and the trans wells 7. Current passes through each nanopore 4 and is measured by the bottom electrodes 13.

In the example shown in FIG. 3, the substrate 1 defines each of the trans wells 7 of the array A. Moreover, a second substrate 6 (which may be part of a fluidic manifold) is sealed to the substrate 1 through gaskets, an adhesive, or another mechanism that can seal the substrates 1, 6 together in the desired manner.

The electrolyte 14 may be any electrolyte that is capable of dissociating into counter ions (a cation and its associated anion). As examples, the electrolyte 14 may be any electrolyte that is capable of dissociating into a potassium cation ($K^+$) or a sodium cation ($Na^+$). This type of electrolyte 14 includes a potassium cation and an associated anion, or a sodium cation and an associated anion, or combinations thereof. Examples of potassium-containing electrolytes include potassium chloride (KCl), potassium ferricyanide ($K_3[Fe(CN)_6]$. $3H_2O$ or $K_4[Fe(CN)_6]$. $3H_2O$), or other potassium-containing electrolytes (e.g., bicarbonate ($KHCO_3$) or phosphates (e.g., $KH_2PO_4$, $K_2HPO_4$, $K_3PO_4$)). Examples of sodium-containing electrolytes include sodium chloride (NaCl) or other sodium-containing electrolytes, such as sodium bicarbonate ($NaHCO_3$), sodium phosphates (e.g., $NaH_2PO_4$, $Na_2HPO_4$ or $Na_3PO_4$). As another example, the electrolyte may be any electrolyte that is capable of dissociating into a ruthenium-containing cation (e.g., ruthenium hexamine, such as $[Ru(NH_3)_6]^{2+}$ or $[Ru(NH_3)_6]^{3+}$). Electrolytes that are capable of dissociating into a lithium cation (Lit), a rubidium cation ($Rb^+$), a magnesium cation ($Mg^{+2}$), or a calcium cation ($Ca^{+2}$) may also be used.

While not shown in FIG. 1 and FIG. 2, but as represented by the arrows and the grounding symbol in FIG. 3, it is to be understood that the nanopore sensing systems 10, 10' include electronic circuitry to apply a bias to the metal based membrane 2. When a suitable bias is applied, biomolecules that have been introduced into the cis well 8, 8' with an electrolyte solution are translocated through the channel 2a or the biological nanopore 4 held within the channel 2a, and the resistive current pulses are measured. These resistive current pulses reveal the identity of the passing sequence of nucleotide or amino acid, or any other structural unit of the translocating biomolecule.

The membranes 2 of the nanopore sensing systems 10, 10' may be formed via a variety of methods.

In one example, the method includes forming a liquid metal droplet on a temporary substrate; in a controlled environment, exposing the liquid metal droplet to oxygen gas or hydrogen sulfide or ammonia, thereby at least partially oxidizing or sulfurizing or nitriding the liquid metal droplet; and transferring at least a portion of the oxidized or sulfurized or nitrided liquid metal droplet to another substrate to form a metal based membrane having a thickness ranging from about 1 nm to about 3 nm on the permanent substrate. Examples of these methods are shown in FIG. 4 and FIG. 5A.

Figure 4:
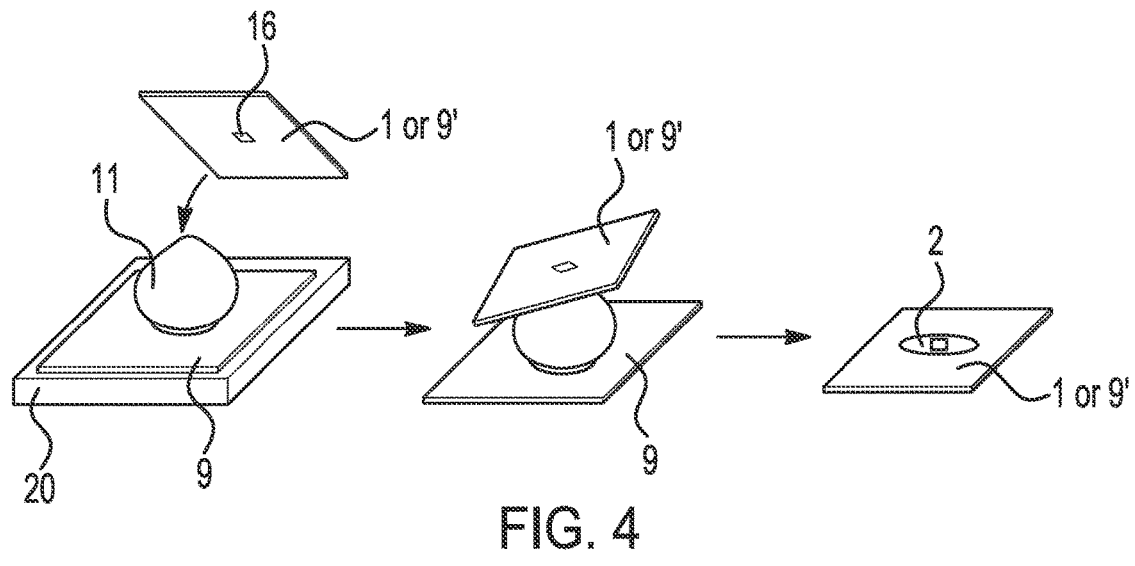
FIG. 4 is a schematic, perspective flow diagram illustrating one example of a method for generating an ultrathin metal based membrane.

The temporary substrate 9 may be any substrate that can release the metal based membrane 2 (FIG. 5A), or that can support the liquid metal droplet 11 during oxidation and transfer of the oxidized portion of the liquid metal droplet 11 to the permanent substrate 1 (FIG. 4). The temporary substrate 9 has a melting point that is higher than the melting temperature of the metal used to form the liquid metal droplet 11. For most metals, this temperature is less than 400° C. One example of a material that may be used for the temporary substrate 9 is glass.

The other substrate to which the oxidized or sulfurized or nitrided liquid metal droplet 11 is transferred may be a permanent substrate (e.g., substrate 1), or may be another temporary substrate 9'. With the former example, the metal based membrane 2 is formed directly on the substrate 1 that is used to form the final nanopore sensing system 10, 10'. With the latter example, the metal based membrane 2 is formed on the temporary substrate 9' and then is transferred to yet another substrate 1 that is used to form the final nanopore sensing system 10, 10'. Depending upon the method used, the other substrate may be any example of the temporary substrate 9 or of the substrate 1.

Figure 5A:
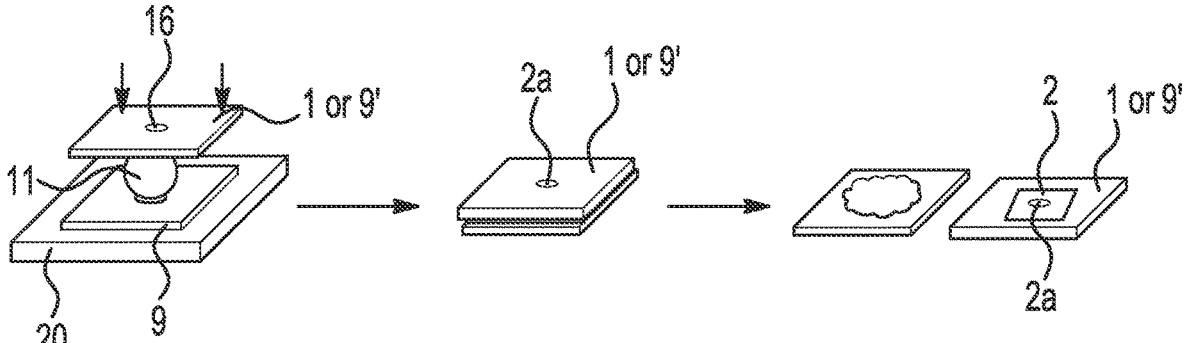
FIG. 5A is a schematic, perspective flow diagram illustrating another example of a method for generating an ultrathin metal based membrane.

The other substrate 9' or 1 may have a continuous surface or may have an aperture 16 defined therein (as depicted in FIG. 4 and FIG. 5A). When a permanent substrate 1 is used that includes the aperture 16, it is to be understood that the diameter or length and width of the aperture 16 is on the nanoscale (i.e., ranging from 1 nm to less than 1,000 nm). The aperture 16 may form the trans well 7 (not shown in FIG. 4 and FIG. 5A), or may form an opening that leads to the trans well 7 in the nanopore sensing system 10, 10' that is ultimately formed.

Any of the substrates 9, 9', 1 may be cleaned before forming the liquid metal droplet 11.

The metal used to form the liquid metal droplet 11 may be any metal that can be oxidized or sulfurized or nitrided to form the desired membrane 2.

In the examples shown in FIG. 4 and FIG. 5A, a solid piece of the desired metal is positioned on the temporary substrate 9. The solid metal and the temporary substrate 9 are heated to or above the melting temperature of the solid metal, converting the solid piece of the desired metal to the liquid droplet 11. In the examples shown in FIGS. 4 and 5A, the temporary substrate 9 is placed on a hot plate 20 or other hot surface 20. For most metals, this temperature is less than 400° C. The size of the solid piece of metal will depends on the target size for the resultant continuous metal based membrane 2. In one example, the metal piece that is used to form the liquid droplet 11 may have a volume ranging from about 1 mm³ to about 10 mm³.

Figure 5B:
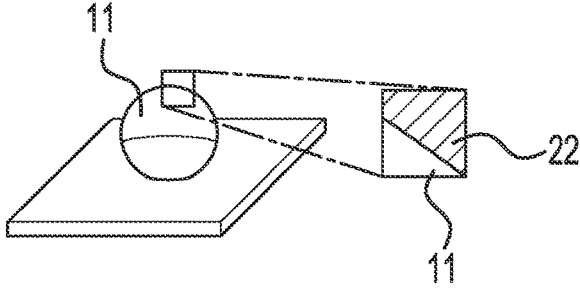
FIG. 5B is a perspective view illustrating a liquid metal droplet on a temporary substrate and an exploded view of a portion of the liquid metal droplet illustrating the formation of an oxide layer at a surface of the liquid metal droplet.

The liquid metal droplet 11 on the temporary substrate 9 is then exposed to an oxidizing or sulfurizing or nitriding environment, such as in an air or glove box with a controlled environment containing a controlled oxygen or hydrogen sulfide or ammonia concentration. The level of oxygen or hydrogen sulfide or ammonia gas that is used and the time for gas exposure may be selected to achieve partial or complete oxidation or sulfurization or nitriding and will depend, at least in part, upon the size of the liquid metal droplet 11. The maximum thickness of the membrane 2 that can be obtained is about 5 nm depending on the metal or alloy; so depending on the desired thickness of the membrane 2, the reaction can be stopped short of complete oxidation or sulfurization (e.g., somewhere between 1 nm and less than 5 nm). The formation of the oxide layer 22 (or sulfide layer 22 or nitride layer 22) at the surface of the liquid metal droplet 11 as a result of being exposed to the oxidizing or sulfurizing or nitriding environment is shown in FIG. 5B. This figure illustrates partial oxidation of the liquid metal droplet 11.

In some examples, from about 100 ppm to about 400 ppm of oxygen gas or hydrogen sulfide or ammonia is used. It is to be understood that the hydrogen gas content should be as low as possible to avoid introducing moisture. The pressure in the glove box may range from about 1 atm to about 1.5 atm.

It is to be understood that complete oxidation or sulfurization or nitriding may take place post gas exposure. For example, non-oxidized portions of the liquid metal droplet 11 may be self-oxidized via Cabrera-Mott re-oxidation.

The metal based membrane 2 may also be formed by squeezing the oxidized, sulfurized, or nitrided liquid metal droplet 11 between the temporary substrate 9 and the other substrate 9' or 1 (see FIG. 5A), or by touching the other substrate 9' or 1 to the oxidized, sulfurized, or nitrided liquid metal droplet 11 (see FIG. 4). When the other substrate 9' or 1 is held steady during squeezing or touching, the resulting metal based membrane 2 is substantially flat and wrinkle free.

When the other substrate is the permanent substrate 1, it is to be understood that the other substrate 1 surface can cleaned in hot ethanol, acetone, or isopropyl alcohol, to remove any chunks of liquid metal that may be present on the substrate 1 after the membrane 2 is formed.

One example method is a squeeze transfer method, where the oxidized, sulfurized, or nitrided liquid metal droplet 11 is squeezed between the temporary substrate 9 and the other substrate, which may be another temporary substrate 9' or the permanent substrate 1. This is shown in FIG. 5A. The properties of the temporary substrate 9 enable the release of the metal based membrane 2 to the other substrate 9' or 1. The squeeze transfer method may be used for blanket or selective formation of the membrane 2 on the other substrate 9' or 1.

Another example method is a touch print method, where the oxidized, sulfurized, or nitrided liquid metal droplet 11 is touched with the other substrate, e.g., temporary substrate 9' or permanent substrate 1. This is shown in FIG. 4. In this example, the substrates 9 and 9' or 1 are not squeezed together, but enough force is applied to transfer at least some of the oxidized, sulfurized, or nitrided liquid metal droplet 11 to the surface of the other substrate 9' or 1. The touch print method may be used for selective formation of the membrane 2 on the other substrate 9' or 1.

With either the squeeze transfer method (FIG. 5A) or the touch printing method (FIG. 4), it is to be understood that the permanent substrate 1 may have the aperture 16 defined therein, and that the metal based membrane 2 is supported by the permanent substrate 1 and extends over the aperture 16. This type of suspended membrane 2 cannot be formed via chemical vapor deposition, atomic layer deposition, or physical vapor deposition. In these examples, the channel 2a may subsequently be formed in the metal based membrane 2, e.g., via a drilling process.

While not shown, with either the squeeze transfer method (FIG. 5A) or the touch printing method (FIG. 4), it is to be understood that the permanent substrate 1 may have a continuous surface. In these examples, the method(s) may further comprise forming a channel 2a in the metal based membrane 2; and forming an aperture (e.g., trans well 7) in the permanent substrate 1.

In another example, the method includes positioning a metal based membrane 2 over a substrate 1 having an aperture 16 defined therein such that the metal based membrane 2 is supported by the substrate 1 and extends over the aperture 16 (e.g., which becomes the trans well); and forming a channel 2a through the metal based membrane 2 so that the channel 2a is aligned with a portion of the aperture 16 in the substrate 1.

In this example, the metal based membrane 2 may first be formed using touch or squeeze printing, as described in reference to FIG. 4 and FIG. 5A respectively, on the other temporary substrate 9'. In this example, the positioning of the metal based membrane 2 over the substrate 1 having an aperture 16 (e.g., trans well 7) defined therein may be performed using stamping or roll-to-roll transfer. This process transfers the membrane 2 formed on the temporary substrate 9' to the permanent substrate 1.

Any of the methods disclosed herein may further include inserting the biological nanopores 4 in the channel 2a.

Any of the methods that generate a metal oxide membrane 2 may further include the step of converting the metal oxide to a nitride or sulfide by treating the formed membrane to an $NH_3$ or $H_2S$ environment.

Any of the methods that generate a metal oxide, a metal sulfide, or a metal nitride membrane 2 may further include the step of exposing the metal oxide or metal sulfide or metal nitride membrane to vapor phase anion exchange or solution-based anion exchange to form a metal phosphide membrane, a metal arsenide membrane, a metal antimonide membrane, a metal selenide membrane, or a metal telluride membrane.

The methods disclosed herein may also be used for electrical tunability of the membrane 2. This will depend upon the materials used. As examples, p-type semiconductors (e.g., SnO) may be formed, n-type semiconductors ($SnO_2$) may be formed, or P-N junctions may be formed (e.g., p-SnO/n-$SnO_2$ and p-SnO/n-$In_2O_3$, p-SnO/n-$SnO_2$, etc. A combination of layers may enable multimodal detection of the translocating biomolecules or other molecules.

The methods disclosed herein may also be used for chemical tunability of the membrane 2. This will depend upon the materials used. For example, heterostructures such as $SnO/In_2O_3$ or $WS_2/Ga_2O_3$ may be formed. Doping or alloying may be performed by introducing additional solid metals during the melting process. One example of a doped or alloyed membrane is sulfur doped indium oxide. Chemical tunability may also be performed by functionalizing the membrane 2 with desired surface groups.

The methods are also reproducible, generating membranes 2 having thicknesses within 0.2 nm variation. The membranes can be characterized, for example, using atomic force microscopy.

The methods and membranes 2 disclosed herein may offer many advantages. The ultrathin membranes 2 may improve spatial resolution and reduce mechanical noise (e.g., by at least three orders of magnitude), without compromising mechanical stability, when compared to thicker membranes used in nanopore fabrication. The membrane surface functionalization described herein may be selected to i) avoid the sticking of biomolecules and thus result in lower levels of non-specific interactions, ii) slow down biomolecule translocation (thus helping to reduce or eliminate temporal resolution), and/or iii) covalently or otherwise bind the biological pores. Covalent binding between the biological pore and the membrane 2 can also reduce or eliminate electrolyte leakage.

The membrane 2 may be used to control and/or modify the pore surface charge and/or geometry (e.g., conformation, inner diameter, and/or outer diameter) by modulating an electric bias applied on the conductive examples of the membrane 2. Modulating the electrical bias on the membrane 2 enables the modulation of the translocation speed of the biomolecule through the nanopores. This, in turn, allows for the tuning of the surface charge and the modulation of the thickness of the Debye screening layer of ions. The biomolecule translocation can also be halted in a controlled and systematic manner, which can be used to improve the signal-to-noise ratio. Tuning the electrical bias on the membrane 2 also enables the event frequency to be tuned to a desirable level for a desired throughput. As noted, the electrical bias can alter the pore geometry, which can be used to achieve frictionless or increased friction translocation of the biomolecule as desired. Tightening the pore geometry can also reduce electrolyte leakage. Electrically biasing the ultrathin membrane 2 in order to achieve a specific type and magnitude of charge on the surface of the membrane 2 or inside the channel 2a, 4a can reduce non-specific interactions of biomolecules. Still further, the ability to electrically bias the ultrathin membrane 2 allows for a reversible piezoelectric effect-based tuning of nanopore geometry and surface charge as some of the metal based materials (e.g., oxides, sulfides, etc.) presented here are piezoelectric.

Still further, the example nanopore sensing systems 10, 10' may be used to obtain multimodal current-time records of the translocating biomolecules, such as DNA, which allows for reliable measurements and statistically improved signal analysis, leading to higher accuracy of the measured sequence data.

As such, an example of using the nanopore sensing system 10 or 10' includes introducing a DNA sample to the cis well 8; and modulating an electrical bias applied to the metal based membrane 2 to translocate the DNA sample through the channel 2a.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A method, comprising:
forming a liquid metal droplet on a temporary substrate;
in a controlled environment, exposing the liquid metal droplet to oxygen gas or hydrogen sulfide or ammonia, thereby at least partially oxidizing or sulfurizing or nitriding the liquid metal droplet; and
transferring at least a portion of the oxidized liquid metal droplet or the sulfurized liquid metal droplet or the nitridized liquid metal droplet to an other substrate to form a metal oxide or metal sulfide or metal nitride membrane having a thickness ranging from about 1 nm to about 3 nm on the other substrate.

2. The method as defined in claim 1, wherein the other substrate has an aperture defined therein, and wherein the metal oxide or metal sulfide or metal nitride membrane is supported by the other substrate and extends over the aperture.

3. The method as defined in claim 1, further comprising:
forming a channel in the metal oxide or metal sulfide or metal nitride membrane; and
forming an aperture in the other substrate.

4. The method as defined in claim 1, wherein:
the other substrate has a continuous surface;
the method further comprising transferring the metal oxide or metal sulfide or metal nitride membrane from the other substrate to a permanent substrate having an aperture defined therein; and
the metal oxide or metal sulfide or metal nitride membrane is supported by the permanent substrate and extends over the aperture.

5. The method as defined in claim 1, further comprising exposing the metal oxide or metal sulfide or metal nitride membrane to vapor phase anion exchange or solution-based anion exchange to form a metal phosphide membrane, a metal arsenide membrane, a metal antimonide membrane, a metal selenide membrane, or a metal telluride membrane.

* * * * *